United States Patent [19]

Everett et al.

[11] Patent Number: 4,555,629
[45] Date of Patent: Nov. 26, 1985

[54] METHOD AND APPARATUS FOR DETERMINATION OF SAMPLE HOMOGENEITY IN SCINTILLATION COUNTING

[75] Inventors: Leroy J. Everett, Glen Ellyn; Stanley J. DeFilippis, Woodridge, both of Ill.

[73] Assignee: Packard Instrument Company, Inc., Downers Grove, Ill.

[21] Appl. No.: 529,439

[22] Filed: Sep. 6, 1983

[51] Int. Cl.$^4$ ............................................. G01T 1/204
[52] U.S. Cl. .................................. 250/362; 250/328; 250/369
[58] Field of Search ................. 250/328, 362, 364, 369

[56] References Cited

U.S. PATENT DOCUMENTS

| | | | |
|---|---|---|---|
| 3,979,503 | 9/1976 | Kaartinen | 523/580 |
| 3,999,070 | 12/1976 | Tarkkanen | 250/362 |
| 4,002,909 | 1/1977 | Packard et al. | 250/328 |
| 4,029,401 | 6/1977 | Nather | 250/369 |
| 4,315,151 | 2/1982 | Horrocks | 250/364 |

OTHER PUBLICATIONS

Horrocks et al, "Common Problems in Sample Preparation for Liquid Scintillation Counting", Laboratory Practice, vol. 30, No. 5, May 1981.
Horrocks et al, "Instrumental Methods for Detecting Some Common Problems in Liquid Scintillation Counting", Laboratory Practice, vol. 30, No. 5, May 1981.
E. T. Bush, "A Double Ratio Technique as an Aid to Selection of Sample Preparation Procedures in Liquid Scintillation Counting", International Journal of Applied Radiation and Isotopes, 1968, vol. 19.
Everett et al, "The Application of Spectral Analysis in Liquid Scintillation Counting", Liquid Scintillation Counting Recent Applications and Development, vol. 1, Physical Aspects.
Fox, "Recent Advances in Sample Preparation", Liquid Scintillation Counting Recent Applications and Development, vol. II, Sample Preparation and Applications.
Bransome, Jr. et al, "Local Absorption of Low Energy Betas by Solid Supports: A Problem in Heterogeneous Counting".
DeFilippis et al, "Dual Label Determination of Tritium and Iodine-125 by Liquid Scintillation Counting", Techniques & Applications of Liquid Scintillation Counting-1.

Primary Examiner—Alfred E. Smith
Assistant Examiner—Carolyn E. Fields
Attorney, Agent, or Firm—Robert P. Hayter

[57] ABSTRACT

A method for ascertaining radiochemical homogeneity in a liquid scintillation sample reliably identifies inaccurate geometries is disclosed so that meaningful activity counts can be determined. The novel method involves measuring the activity level of a set of homogeneous quench standard to obtain quench indicating parameter, or the Spectral Index of the External standard (SIE). The endpoint of each standard sample is computed allowing the formation of a table so that a calibration curve for each radionuclide of interest can be computed. The activity level of the unknown sample is then measured and the SIE determined so that an endpoint can be calculated. Finally, the theoretical endpoint obtained from a calibration curve is compared to the computed endpoint; if the computed endpoint of the sample deviates by more than 4% for tritium and 5% for higher energy radionuclides from the theoretical endpoint, the sample is considered to be nonhomogeneous or heterogeneous. An external standard-type liquid scintillation counting system is disclosed which automatically determines sample homogeneity, and it includes a microprocessor in its control system. The steps of the present invention and incorporated into the programmed steps for the microprocessor such that nonhomogeneous or heterogeneous samples are automatically identified on the readout of the system for an investigator.

5 Claims, 7 Drawing Figures

FIG. 3   CARBON-14 ENDPOINT VS QIP (SIE)

FIG. 4   P-32 ENDPOINT VS QIP (SIE)

*FIG. 5*  I-125 ENDPOINT VS QIP (SIE)

METHOD AND APPARATUS FOR DETERMINATION OF SAMPLE HOMOGENEITY IN SCINTILLATION COUNTING

TECHNICAL FIELD

This invention relates to a method useful to enhance the accuracy of liquid scintillation counting systems and, more particularly, to a technique for determining radiochemical homogeneity in a liquid scintillation sample as well as an improved scintillation counting system for automatically evaluating sample homogeneity.

BACKGROUND ART

Liquid scintillation counting is generally known and is a widely used technique for the measurement of low energy beta emitting radionuclides in addition to gamma and alpha emitters. As is known, a sample whose emission characteristics is to be measured is mixed in a solution called a cocktail. The cocktail typically includes a solvent such as toluene, xylene, and dissolved solutes, such as fluors. The solvent absorbs the energy of the radioactive decay and transfers it to the fluors. When a fluor molecule decays to the ground state it gives off a photon of light. For every radioactive decay event there are many photons produced and the number of photons is proportional to the energy of the decay. Each light event is converted in a photomultiplier to an electrical signal so that the occurrence can be recorded in the scintillation counter.

Typically an analytical method is used in a scintillation counter to measure the radioactivity by incorporating a radiolabeled analyte into solution with the fluors in the scintillation cocktail. It is particularly important in the preparation of radioactive samples for a scintillation counter to ensure that the radiochemical sample is compatible with the scintillation medium. Emulsifier-type scintillation cocktails are designed to incorporate the aqueous sample into intimate contact with the fluors in the organic phase. If the sample is not homogeneous, local variations in radionuclide solution geometry will cause a nonreproducible sample activity. Additionally, the use of quench correction in heterogeneous samples often results in inaccurate, nonreproducible determinations of sample activity.

Several prior art methods have been proposed for measuring sample homogeneity. One such method is a dual-ratio technique described in an article published in the *International Journal of Applied Radiation and Isotopes*, 1968, Vol. 19, pages 447–462 by E. T. Bush for "A Double Ratio Technique As An Aid To Selection Of Sample Preparation Procedures In Liquid Scintillation Counting". This technique is based on the fact that efficiency for counting radioactive samples depends upon both the degree of cocktail quenching in the solution based on an external standard and upon the extent to which the sample material is uniformly dispersed in the cocktail. Thus, the external standard can be used to measure quenching independently of efficiency with which the radioisotope is actually being counted. A plot can be made of sample channels ratio versus external standard channels ratio for a set of standard, quenched solution samples. Unknown samples, if they are true solutions, should give values falling on this curve. Deviations from the curve in a direction of "more quench" sample ratio indicate samples are not completely dissolved. A deficiency of the dual ratio technique is that it is only applicable in single label analysis.

The impact of heterogeneous solution in creating erroneous results was also described in two articles published in *Laboratory Practice*, Vol. 30, No. 5, May 5, 1981 by D. Horrocks and A. Kolb in "Common Methods In Sample Preparation For Liquid Scintillation Counting" and "Instrumental Methods For Detecting Some Common Problems In Liquid Scintillation Counting". The latter article describes a liquid scintillation system which has the capability of identifying certain types of errors occurring in liquid scintillation samples, one of these which identifies a separation of the organic scintillant and aqueous sample. This particular scintillation counter involves determining the pulse height spectrum for Compton electron. If the Compton edge is discontinuous it is concluded that the sample is two-phased. Although this method is applicable to multiple radiolabeled analytes in samples, a limitation of this particular method is that two distinct liquid phases are required, both of which must scintillate. However, if only one of the two phases scintillates, i.e., adsorption on an inert support, this method will not work. Accordingly, this method would falsely identify samples of radiolabeled analytes absorbed into solid supports, such as a filter disc or sample adsorption, as homogeneous.

Any loss of physical contact between the radiolabeled analytes and the fluors of the scintillation cocktail creates a heterogeneous sample resulting in erroneous readings. Radiolabeled analytes which have become partially or totally removed from the organic phase produce different radionuclide counting efficiencies depending upon the extent of dissolution in each phase. Hydrophilic cocktails in which the aqueous holding capacity has been exceeded results in phase separation. Nearly all emulsifier-type cocktails have regions of instability in which the aqueous material is not in solution. The extent of these regions will be dependent upon temperature, volume of cocktail, the volume of the analyte, solutes in the analytes, and time. A nonpolar organic soluble radiochemical will always remain in true solution within an emulsifier cocktail although the cocktail appears to be phase separated. The geometry of the radiochemical species is essentially $4\pi$ in relation to the organic scintillating phase for true solution samples. In heterogeneous samples the external standard measurement indicates physical change occurring within the organic scintillation phase. The external source of scintillation events cannot effectively reflect the geometric distribution of the radio compounds. Since the radiochemical is in close contact with the scintillation medium, changes in physical counting environment in relationship to the radionuclide distribution would be indicated by a modified sample pulse height energy distribution.

DECLOSURE OF INVENTION

It is an object of the invention to provide a novel method as well as an improved apparatus for determining sample homogeneity in a liquid scintillation counting device.

A feature of the present invention is that radiochemical homogeneity is readily determined in a liquid scintillation sample so that a meaningful activity count by the scintillation counter can be distinguished from inherently inaccurate geometries.

A particular feature of the present invention is that nonhomogeneous liquid scintillation counting environments caused by adsorption, selfadsorption, precipitation and phase separation of the radioactive material from the scintillation solution in a scintillation cocktail are quickly and accurately identified.

An advantage of the present invention is that even within a liquid scintillation sample containing a multiplicity of radionuclides, the homogeneity can be determined by utilizing the end point of the higher energy radionuclide. Simply stated, by measuring the end point energy of the higher energy radionuclide in a sample to be assayed, an indication of the homogeneity of the lower energy radionuclide is obtained.

According to the present invention a novel scintillation counting system automatically identifies inaccuracies in the counting process related to phase separation or other nonhomogenetic state thereby ensuring accurate, and repeatable, computation of radionuclide activity.

According to another feature of a liquid scintillation system of the present invention, both single and multiple radiolabeled solutions are rapidly and accurately identified for solution nonhomogeneity which can otherwise inhibit an accurate activity count.

According to the present invention, the QIP (Quench Indicating Parameter) of an external standard radionuclide is measured and the end point of each standard is computed and recorded An equation which reflects the best fit to the data points is then determined. The QIP of each sample is measured and then the end point of each sample is computed. By a comparison of the measured end point with the theoretical end point, sample homogeneity can be quickly and accurately identified.

The foregoing and other objects, features and advantages of the present invention will become more apparent from the following description of preferred embodiments and accompanying drawings.

BEST MODE FOR CARRYING OUT THE INVENTION

Briefly, the present invention involves a method and apparatus for rapidly and accurately identifying a non-homogeneous or heterogeneous condition in a sample incorporating a radiolabeled analyte. This invention can be used with any external standard type liquid scintillation counter which stores energy pulse height spectra, such as the Packard TRI-CARB ® Spectralyzer Series Liquid Scintillation Spectrometer. The technique of the present invention is particularly well suited for accurate reproducible results in an unquenched to a heavily quenched environment. Single and multiple radiolabeled analytes in either hydrophobic or hydrophilic scintillation solutions can be used while any nonstable counting samples can be identified based on both the degree of cocktail quenching and radionuclide end point. True solution counting is determined by reference to the simple but novel method and technique of the present invention. This technique is essentially independent of true solution volume over at least a range of 10 ml to 20 ml with solutions having a wide range of quench levels.

The present invention involves measuring the activity level of a set of homogeneous quench standards in a suitable liquid scintillation counter, such as a Packard TRI-CARB ® 460C Scintillation Counting System or other comparable scintillation counting system, to obtain a quench indicating parameter, such as its Spectral Index of the External Standard (SIE), which reflects the external standard induced events. The end point of each standard is computed by a quadratic polynomial technique which is applicable to most spectral shapes encountered with various radiolabeled analytes, even those in which the energy distribution is compressed with increasing quench. As is known, some radionuclides produce complex pulse height spectra such as iodine 125 and this technique is still suitable for calculating the radionuclide end point.

In accordance with the present invention, the SIE values and the calculated end point values for the radionuclides of interest are then combined to form a table. From this table, a "best fit" equation based on the data in the table is calculated forming one radionuclide calibration line in the case of a single label radionuclide. In the case of a multiple labeled radionuclide solution, a separate radionuclide calibration equation would be identified for each radionuclide of interest.

Next, in utilizing the technique of the present invention, the sample is loaded into the liquid scintillation counting system or machine. The quench indicating parameter is determined. The activity level of the unknown sample is measured with the counting system and the SIE and various data points are stored so that the endpoint for each radionuclide can then be calculated.

As will be appreciated by those of ordinary skill, in the case of multiple labeled radionuclides in a sample, the endpoint of the higher energy radionuclide is searched for first. The normal procedure would be to search from zero energy to the highest energy statistical events in the energy spectrum. Finally, this theoretical endpoint obtained from a calibration curve is compared to the computed endpoint. If the computed endpoint of the sample deviates more than for 4% tritium or 5% for higher energy radionuclides from the theoretical endpoint, then the sample is considered nonhomogeneous or heterogeneous. It should be understood that in high resolution systems the endpoint deviation value may decrease very slightly due to increased energy resolution of the A to D converters. On the other hand, in low resolution systems the endpoint deviation value criteria may increase to 5 or 6%.

It should be appreciated that a statistically accurate number of counts in a spectrum must be taken in order to accurately compute radionuclide endpoint and in turn accurately determine whether given sample is homogeneous or nonhomogeneous. For example, typically 1500 counts are required for tritium or carbon-14, this being 150 counts per minute measured over a ten-minute time period.

EXPERIMENT 1

An important feature of the sample homogeneity method of the present invention is that the radionuclide equation for a given radionuclide is nearly identical for the cocktails tested. One series of experiments using five different commonly available off-the-shelf emulsifier-type scintillation cocktails, i.e., INSTA-GEL ®, MONOPHASE ® 40, PICOFLUOR TM 30, PICOFLUOR TM 15, and OPTI-FLUOR TM cocktails (all of which are emulsifier-type scintillation cocktails manufactured by Packard Instrument) demonstrate the universal application of the sample homogeneity method. A single labeled tritium and carbon-14 aqueous soluble radiolabeled analyte was used to simulate a typical laboratory situation. The radiolabeled analyte in these experiments was an amino acid. Into standard glass scintillation vials a sufficient amount of radioactivity was introduced to 10.0 ml of a given emulsifier cocktail which was mixed with an increasing amount of nonradioactive water to produce a range of quench samples between 1.5% and 48.9% volume/volume of the aqueous components. This amount of quenching agent typically produces quench indicating parameter SIE values ranging between 710, least quenched, to 400, most quenched. A statistically accurate energy distribution spectrum containing approximately 250,000 total counts was produced in not longer than five minutes. Each sample spectrum was collected for a similar level of statistical precision not to exceed 0.5% at 2 sigma of the total counts, or five minutes counting time. A similar experiment using conditions previously described was conducted using a simple hydrophobic cocktail prepared by mixing 4.0 grams of PPO (diphenyloxazole) with 0.25 grams of Me$_2$POPOP (1,4-bis-2-(4-Methyl-5-Phenyloxazolyl)Benzene) scintillators per liter of scintillation grade toluene. Single labeled homogeneous samples of tritium as tritiated toluene and carbon-14 labeled toluene were prepared in 10.0 ml of the toluene scintillator. These solutions were chemically quenched with increasing amounts of a toluene soluble agent to yield quench indicating values, SIE, ranging between approximately 1000 (unquenched) and 270 (severely quenched). Since toluene in toluene typically defines a homogeneous counting solution, correlating the quench indicating values (SIE) to the computed radionuclide endpoint for a given radionuclide establishes the radionuclide equation.

Figure 1:
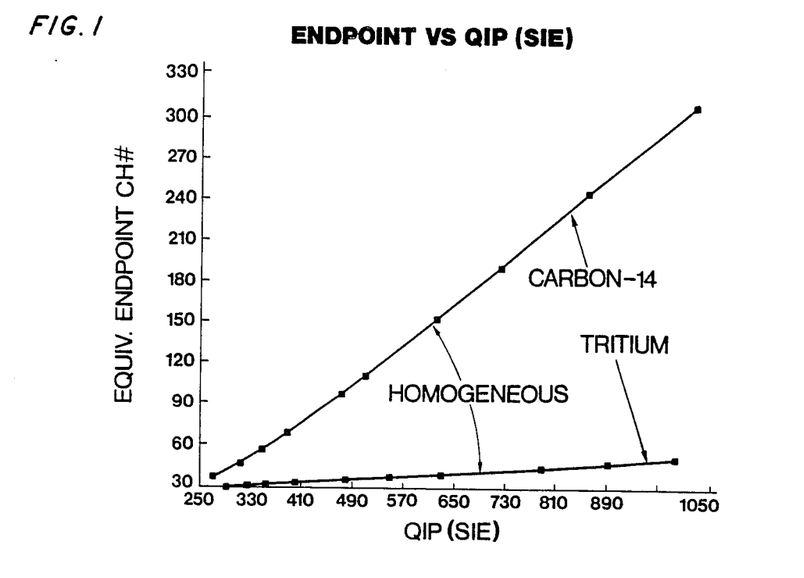
FIG. 1 is a graph of Equivalent End Point Channel versus the quench indicating parameter, or the Spectral Index of the External standard (SIE), for tritium and carbon-14.

A particular feature of the present invention is the recognition that homogeneous counting solutions containing a given radionuclide produce a nearly linear relationship between the observed radionuclide end point and the quench indicating parameter, SIE. This aspect can be observed in FIG. 1, which shows the relationship for tritium and carbon-14. A moderate degree of quenching, approximately 550 SIE, was chosen to represent conditions depicted in FIG. 1, this being that which a researcher would typically encounter.

Using the radionuclide equations generated with homogeneous counting solutions of tritium and carbon-14 in the toluene scintillator, estimated radionuclide end point at a given quench value (550 SIE) was computed as listed in Table I. Thus, the close relation between the radionuclide computed end point was used as a comparative measure of the end point determination and homogeneity identification among the different cocktails. The radionuclide end point equation for these scintillation cocktails was essentially identical as expressed by the mean and uncertainty values in Table I. The results for PICOFLUOR TM 15 and OPTI-FLUOR TM cocktails were not included in Table I as it should be understood that these cocktails do not produce homogeneous stable counting systems with the corresponding aqueous concentration needed to yield an SIE value of approximately 550.

TABLE I

| Radionuclide Endpoint Determination Homogeneous Counting Solutions Quench Indicating Parameter SIE 550 | | |
|---|---|---|
| Cocktail | $3_H$ Computed Endpoint Chnl | $14_C$ Computed Endpoint Chnl |
| Toluene Scintillator | 16.969 | 125.03 |
| INSTA-GEL ® | 16.206 | 122.71 |
| MONOPHASE ® 40 | 16.384 | 124.32 |
| PICOFLUOR TM 30 | 16.463 | 126.14 |
| Average | 16.506 | 124.55 |
| 1 Sigma % Deviation | ±1.98% | ±1.15% |

EXPERIMENT 2

As is recognized, certain complex scintillation cocktails, such as the emulsifier type, may have several regions of instability which adversely affect counting geometry. These unstable regions may typically vary with time, temperature, quenching agents, dissolved solutes, etc., which may be in the radiolabeled analyte. The method of the present invention is particularly helpful to an investigator by identifying the existence of a heterogeneous condition which might otherwise go undetected.

The results of this experiment are shown below in Table II and FIGS. 2 and 3. It will be noted that in one case a tritium labeled sample was determined to be homogeneous while the respective carbon-14 sample was identified as heterogeneous, this being related to partial stability in the emulsifier-type cocktail.

The complex nature of emulsifier-type cocktails may generate regions of instability. Settling time and temperature are both important factors in emulsifier stability. It is typical to observe a borderline homogeneous sample become heterogeneous with an increased time interval between measurements. INSTA-GEL ® cocktail ensures homogeneous stable counting systems with aqueous samples at 8° C. between 1% and 12% and 22% and 50% water by volume. In some cases where a tritium labeled sample was determined to be homogeneous (borderline) the respective carbon-14 sample was identified as a heterogeneous sample. This effect is an inherent property of a given emulsifier cocktail.

TABLE II

Radionuclide Homogeneity INSTA-GEL ®
1.5–48.9% Aqueous Load 8° C.

| % H₂O | SIE | Endpoint Channel Computed | Endpoint Channel Theory | Status |
|---|---|---|---|---|
| Radionuclide: Tritiated Amino Acid | | | | |
| 1.5 | 693.6 ± 0.42% | 21.27 ± 0.24% | 20.97 | Homogen. |
| 4.0 | 653.6 ± 0.23% | 19.50 ± 0.20% | 19.66 | Homogen. |
| 8.0 | 622.8 ± 0.40% | 18.50 ± 0.13% | 18.65 | Homogen. |
| 12.2 | 596.4 ± 0.19% | 17.86 ± 0.21% | 17.78 | Homogen. |
| 14.9 | 613.6 ± 0.19% | 17.86 ± 0.21% | 18.35 | Homogen. |
| 16.0 | 621.2 ± 0.29% | 17.79 ± 0.13% | 18.60 | Heterog. |
| 20.2 | 597.2 ± 0.25% | 17.37 ± 0.33% | 17.81 | Homogen |
| 24.6 | 583.6 ± 0.36% | 17.00 ± 0.10% | 17.36 | Homogen. |
| 30.0 | 550.8 ± 0.33% | 16.51 ± 0.16% | 16.29 | Homogen. |
| 48.9 | 440.2 ± 0.30% | 12.72 ± 0.30% | 12.65 | Homogen. |
| Radionuclide: Carbon-14 Amino Acid | | | | |
| 1.5 | 689.0 ± 0.27% | 176.81 ± 0.45% | 176.71 | Homogen. |
| 4.0 | 648.8 ± 0.33% | 162.11 ± 0.26% | 161.22 | Homogen. |
| 8.0 | 613.2 ± 0.58% | 148.77 ± 0.48% | 147.50 | Homogen. |
| 12.2 | 588.2 ± 0.33% | 138.99 ± 0.43% | 137.86 | Homogen. |
| 14.9 | 600.2 ± 0.18 | 132.71 ± 0.22% | 142.49 | Heterog. |
| 16.0 | 629.8 ± 0.47% | 129.04 ± 0.28% | 153.90 | Heterog. |
| 20.2 | 589.2 ± 0.30% | 134.67 ± 0.16% | 138.25 | Homogen. |
| 24.6 | 570.6 ± 0.27% | 128.01 ± 0.45% | 131.08 | Homogen |
| 30.0 | 535.0 ± 0.40% | 115.43 ± 0.65% | 117.36 | Homogen. |
| 48.9 | 431.6 ± 0.39% | 79.128 ± 0.25% | 77.51 | Homogen. |

Figure 2:
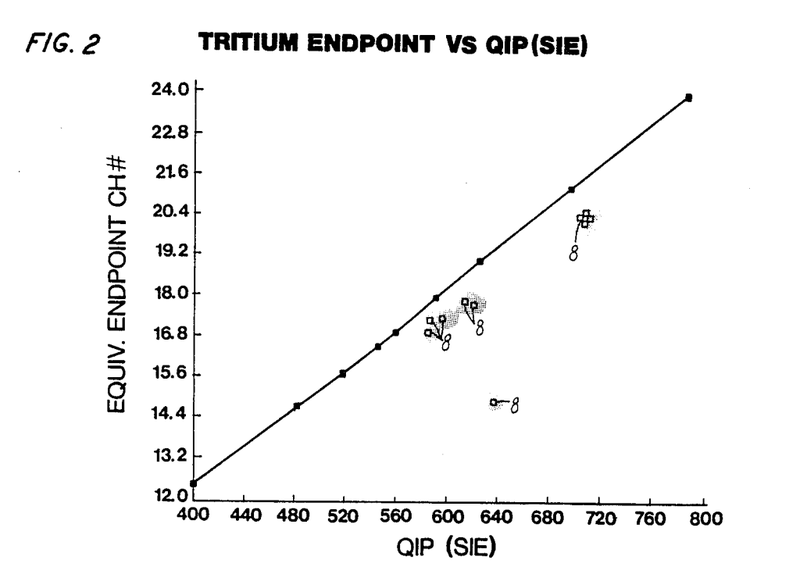
FIG. 2 is a graph of the Equivalent End Point Channel versus SIE for tritium in water, this being based on the data shown in Table II.
Figure 3:
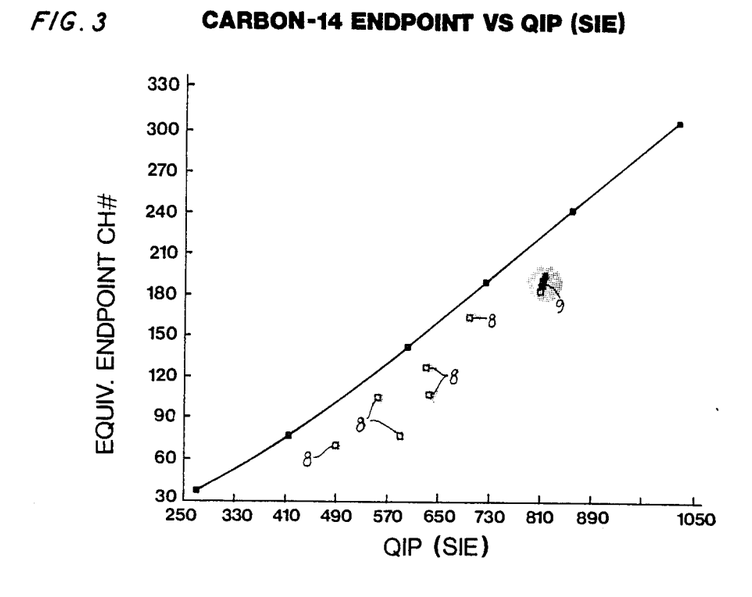
FIG. 3 is a graph of the Equivalent End Point Channel versus SIE for carbon-14 in water, this being based on the data shown in Table II.

Of particular interest on FIGS. 2 and 3 are points 8 which illustrate nonhomogeneous states associated with a dual-phase state of certain emulsifier cocktails. Other nonhomogeneous states associated with a radiolabled evaporated on glass filter disks and counted in a toluene scintillation solution are shown by points 9.

EXPERIMENT 3

The basic purpose of this experiment was to demonstrate the precision and accuracy of the end point determination and heterogeneity identification in low (150 cpm) to moderate (25000 cpm) activity levels. A carbon-14 amino acid ranging in activity between 150 cpm and 25000 cpm was counted using INSTA-GEL ® as the scintillation solution which contained four different aqueous concentrations. The four levels of aqueous percentage were 1.5%, 12.2%, 16.0%, and 48.9%.

The counting conditions used to measure these samples were similar to previously discussed methods with the exception of the counting time which was extended to 10.0 minutes per sample. Carbon-14 was chosen for this experiment because it is a more rigorous test of the endpoint determination than tritium. As the radionuclide energy increases to higher channels, the average counts per channel actually decrease due to spectral dilution. A similar effect occurs with spectral quenching where an unquenched pulse height distribution spectrum has a lower number of counts per channel than does a more heavily quenched spectrum. It will be noted that as the energy spectrum shifts to lower energies, the counts per channel increase. A statistical number of counts per channel is accumulated above background an accurate and reproducible radionuclide endpoint determination. The accuracy and reproducibility of the endpoint determination depends on the allowable spectra accumulation time and the radionuclide activity. The minimum number of counts per minute for carbon-14 accumulated in a 10.0 minute time period was 150 cpm. In a sample of carbon-14 labeled amino acid in INSTA-GEL ® with 1.5% aqueous load the minimum number of counts per channel which produced an accurate and reproducible spectral endpoint determination was approximately 8.4 counts/channel. A proportionate increase in the number of accumulated counts per channel would be required for higher energy radionuclides than carbon-14 in order to parallel the spectral dilution effect. The radionuclide endpoint determination in samples containing approximately 150 cpm to 25000 cpm was statistically reproducible within one sigma percent of the mean values over the quench range tested, 719–442 SIE. The radionuclide equation for carbon-14 in INSTA-GEL ® was used to estimate the theoretical radionuclide endpoint and correctly identify all of the INSTA-GEL ® samples at 16.0% water at each activity level tested as heterogeneous mixtures.

TABLE III

Carbon-14 Endpoint Determination

| ¹⁴C cpm | SIE | % H₂O | Counts/ Channel | Endpoint Channel Computed | Endpoint Channel Theory | Status |
|---|---|---|---|---|---|---|
| *150, 200, 250 2500, 25000 | 719 ± 0.14% | 1.5 | 8.4–1212 | 184 ± 2.76% | 187.8 | Homogen. |
| *150–25000 | 607 ± 0.12% | 12.2 | 10.40–1582 | 144.6 ± 183% | 144.7 | Homogen. |
| *150–25000 | 621 ± 0.15% | 16.0 | 11.19–1633 | 129.7 ± 1.14% 150.1 | Heterog. | |
| *150–25000 | 442 ± 0.15% | 48.9 | 16.80–2267 | 84.29 ± 3.92% | 82.35 | Homogen. |
| **150–25000 | 812 ± 0.21% | Filter | 8.4–1201 | 189.95 ± 2.34% | 223.6 | Heterog. |

*Emulsifier Cocktail
**Toluene Scintillator

EXPERIMENT 4

It will be appreciated by those of ordinary skill that the method of the present invention can also be used with solutions containing other radionuclides, such as higher energy beta emitters as well as a typical gamma emitter commonly measured using liquid scintillation counting technique. In this experiment, phosphorous-32 and iodine-125 radionuclides were chosen for verifying the endpoint determination and radionuclide heterogeneity identification. The results of this experiment are shown in Table IV below. As before, the radionuclide equation was determined for both phosphorous-32 and iodine-125. Iodine-125 is known to be a reactive anion which can easily exchange and iodinate the solvent and fluors, producing intimate radionuclide dissolution which can result in true solution counting performance. This effect can be observed in Table IV where INSTA-GEL ®, at 16.0% aqueous load would normally produce a heterogeneous sample, was identified as homogeneous.

TABLE IV

Radionuclide Homogeneity INSTA-GEL ® 1.5%–48.9% Aqueous Load 8° C.

| % H₂O | SIE | Endpoint Channel Computed | Endpoint Channel Theory | Status |
|---|---|---|---|---|
| Radionuclide: Phosphorous-32 | | | | |
| 1.5 | 705 | 1984.7 | 1980.2 | Homogen. |
| 4.0 | 658 | 1786.1 | 1812.2 | Homogen. |
| 8.0 | 623 | 1695.6 | 1686.9 | Homogen. |
| 12.2 | 589 | 1590.5 | 1565.4 | Homogen. |
| 14.9 | 611 | 1644.0 | 1644.1 | Homogen. |
| 16.0 | 619 | 1605.0 | 1672.7 | Heterog. |
| 20.2 | 598 | 1503.0 | 1597.6 | Heterog. |
| 24.6 | 556 | 1441.5 | 1447.4 | Homogen. |
| 30.0 | 535 | 1371.6 | 1372.3 | Homogen. |
| 48.9 | 453 | 1073.5 | 1079.1 | Homogen. |
| Radionuclide: Iodine-125 | | | | |
| 1.5 | 707 | 73.43 | 73.81 | Homogen. |
| 4.0 | 657 | 66.90 | 66.88 | Homogen. |
| 8.0 | 621 | 61.96 | 61.90 | Homogen. |
| 12.2 | 591 | 59.07 | 57.74 | Homogen. |
| 14.9 | 613 | 61.07 | 60.79 | Homogen. |
| 16.0 | 619 | 63.43 | 61.62 | Homogen. |
| 20.2 | 584 | 55.53 | 56.77 | Homogen. |
| 24.6 | 563 | 53.87 | 53.86 | Homogen. |
| 30.0 | 535 | 50.72 | 49.98 | Homogen. |
| 48.9 | 455 | 38.35 | 38.89 | Homogen. |

EXPERIMENT 5

In another experiment, similar to the one conducted using carbon-14, the minimum sample count rate required to ensure an accurate and reproducible radionuclide endpoint determination within 10.0 minutes of counting time was determined for phosphorous-32 and iodine-125, Tables V, VI. Due to the nature of the radionuclide endpoint determination, ingrowth of phosphorous-32 was eliminated. Approximately 2400 cpm of iodine-125 or phosphorous-32 were required in a sample to produce correct endpoint determinations in aqueous quenched emulsifier cocktails. This experiment demonstrates that the method of the present invention is well suited for use in analytes having a moderate level of quench.

TABLE V

Phosphorous-32 Endpoint Determination INSTA-GEL ® 30% Aqueous Load 8° C.

| Count Time (Min.) | ³²P cpm | SIE | Counts/ Channel | Endpoint Channel Computed | Endpoint Channel Theory | Status |
|---|---|---|---|---|---|---|
| 10.00 | 2887 ± 0.59% | 545 | 20.50 | 1355.6 | 1408.1 | Homogen. |
| 5.25 | 30488 ± 0.25% | 548 | 112.81 | 1393.4 | 1418.8 | Homogen. |
| 1.42 | 113245 ± 0.25% | 556 | 111.10 | 1441.5 | 1447.5 | Homogen. |
| | Average | | | 1396.8 ± 3.08% | | |

TABLE VI

Iodine-125 Endpoint Determination INSTA-GEL ® 30% Aqueous Load 8° C.

| Count Time (Min.) | ¹²⁵I cpm | SIE | Counts/ Channel | Endpoint Channel Computed | Endpoint Channel Theory | Status |
|---|---|---|---|---|---|---|
| 10.00 | 2461 ± 0.64% | 549 | 474.00 | 51.81 | 51.91 | Homogen. |
| 6.10 | 26240 ± 0.25% | 542 | 3142.00 | 49.31 | 50.94 | Homogen. |
| 1.16 | 138891 ± 0.25% | 535 | 3224.00 | 50.72 | 49.97 | Homogen. |
| | Average | | | 50.61 ± 2.48% | | |

Figure 4:
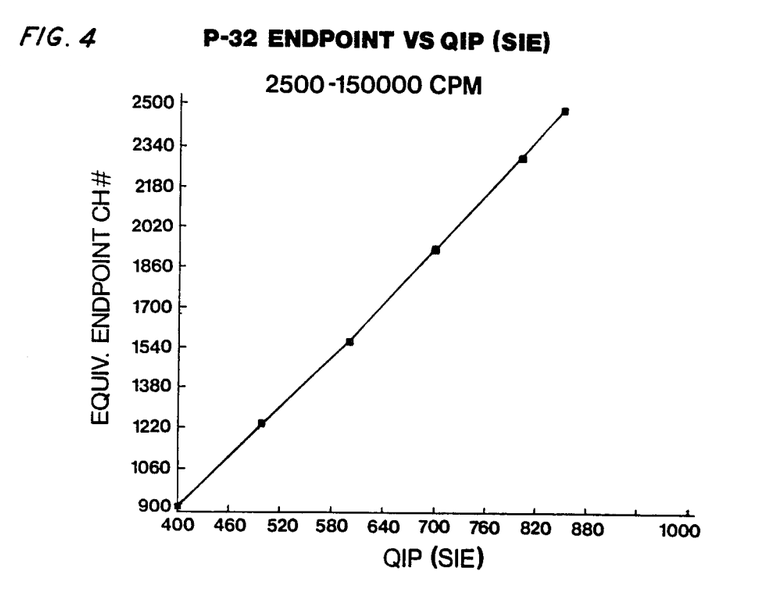
FIG. 4 is a graph of the Equivalent End Point Channel versus SIE for phosphorus-32 using INSTA-GEL ® as the scintillation cocktail, this being based on the data shown in Table IV.
Figure 5:
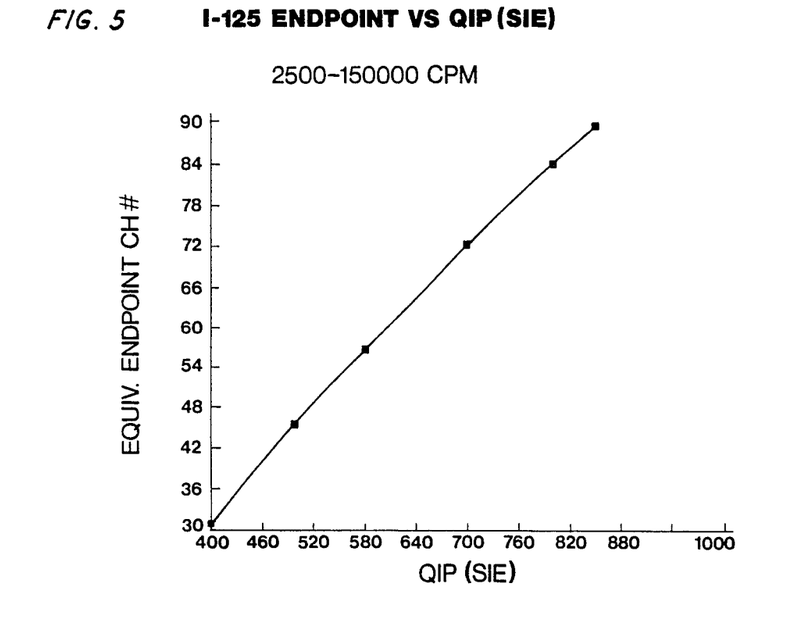
FIG. 5 is a graph of the Equivalent End Point Channel versus SIE for the radionuclide iodine-125 in an INSTA-GEL ® scintillation cocktail, this being based on the data in Table IV.

The radionuclide endpoint determination in both phosphorous-32 and iodine-125 samples was essentially unaffected by the variations in sample activity as shown in both Tables V and VI and FIGS. 4, 5. It should be noted that in situations where the radiolabeled analyte produces a complex pulse height energy distribution, such as with iodine-125, or the pulse height energy distribution which covers a wide energy range, as in the case of unquenched phosphorous-32, it is important that a statistically accurate pulse height spectrum be employed to accurately identify the endpoint. For example, in one experiment both phosphorous-32 and iodine-125 sample ranging in activity between 120 cpm and 220 cpm distributed over 2400 channels ($^{32}P$) and 120 channels ($^{125}I$) were counted for 10 minutes. This proved to be an insufficient count time and yielded a nonstatistical accumulated pulse height spectrum. The measured endpoint for both an iodine-125 and phosphorous-32 sample containing low amounts of activity, approximately 100 cpm, was accurately measured, thus allowing a correct identification of radionuclide homogeneity (Table VII).

TABLE VII

Redionuclide Endpoint Determination Low Level Activity in 0.5% 2 sigma

| Radionuclide | SIE | Endpoint Channel Computed 10 min. | Endpoint Channel Computed 999 min. | Endpoint Channel Theory | Status |
|---|---|---|---|---|---|
| ¹²⁵I 110 cpm | 564 | 89.29 | 55.49 | 53.49 | Homogen. |
| ³²p 83 cpm | 574 | 1626.50 | 1475.1 | 1511.8 | Homogen. |

Using a statistical accumulation of radioactive counts in samples containing low activity such as iodine-125 and phosphorous-32 (Table VII), accurate results were obtained which were within the deviation allowed to make a decision on sample homogeneity.

Radiolabeled analytes of carbon-14, iodine-125, and phosphorous-32 were evaporated on filter disks in one experiment to effectively demonstrate heterogeneity as adsorption effects in liquid scintillation counting (Table VIII). It should be noted that after several days samples containing iodine-125 on filter disks were observed to migrate toward the homogeneous relationship as the fluors and solvent became iodinated producing an intimate radionuclide dissolution and homogeneous samples.

TABLE VIII
Radionuclide Heterogeneity
Adsorbed Activity
Glass Fiber Filter Disks

| Radionuclide | SIE | Endpoint Channel Computed | Endpoint Channel Theory | Status |
|---|---|---|---|---|
| Heterog. | 812.8 ± 0.21% | 189.94 ± 2.33% | | ta,22 225.66 |
| Heterog. | 841.7 ± 0.13% | 2121.9 ± 1.25% | | 2469.1 |
| Heterog. | 843.0 ± 0.59% | 81.96 ± 0.79% | | 91.98 |

As previously mentioned this technique of the present invention is applicable to multiple label analysis. An experiment was conducted to determine the applicability of the end point determination in dual labeled samples as the ratio of both the high energy and low energy radionuclide concentration is varied from 1074 dpm to 20637 dpm of tritium and 728 dpm to 13217 dpm of carbon-14 in a six-by-six matrix (Table IX). The radionuclide equation established for carbon-14 was used to estimate the theoretical higher energy end point which was used to predict the dissolution of the lower energy radiolabeled analyte, in this case a tritiated amino acid, and determine sample homogeneity.

TABLE IX
$^3$H/$^{14}$C Dual Label Endpoint Determination
Emulsifier Type Coctails 8% Aqueous Load 8° C.
Radiolabeled Amino Acid

| $^3$H dpm | $^{14}$C dpm | SIE | Endpoint Channel Computed | Endpoint Channel Theory | Status |
|---|---|---|---|---|---|
| 1074 | 728, 1393, 2817 5445, 7835, 13217 | 634 ± 1.24% | 149.2 ± 2.65% | 151.5 ± 5.0% | Homogen. |
| 2163 | 728–13217 | 637 ± 0.41% | 147.2 ± 0.93% | 152.7 ± 5.0% | Homogen. |
| 4217 | 728–13217 | 634 ± 0.90% | 145.8 ± 1.84% | 151.5 ± 5.0% | Homogen. |
| 8447 | 728–13217 | 638 ± 0.46% | 146.3 ± 2.99% | 153.1 ± 5.0% | Homogen. |
| 12404 | 728–13217 | 640 ± 0.39% | 146.2 ± 0.15% | 153.4 ± 5.0% | Homogen. |
| 20637 | 728–13217 | 636 ± 0.31% | 144.6 ± 1.83% | 152.2 ± 5.0% | Homogen. |

The technique of the present invention is applicable in triple radiolabeled analysis. Homogeneity was determined in radioactive samples containing combinations of tritium, carbon-14, and chlorine-36.

Figure 6:
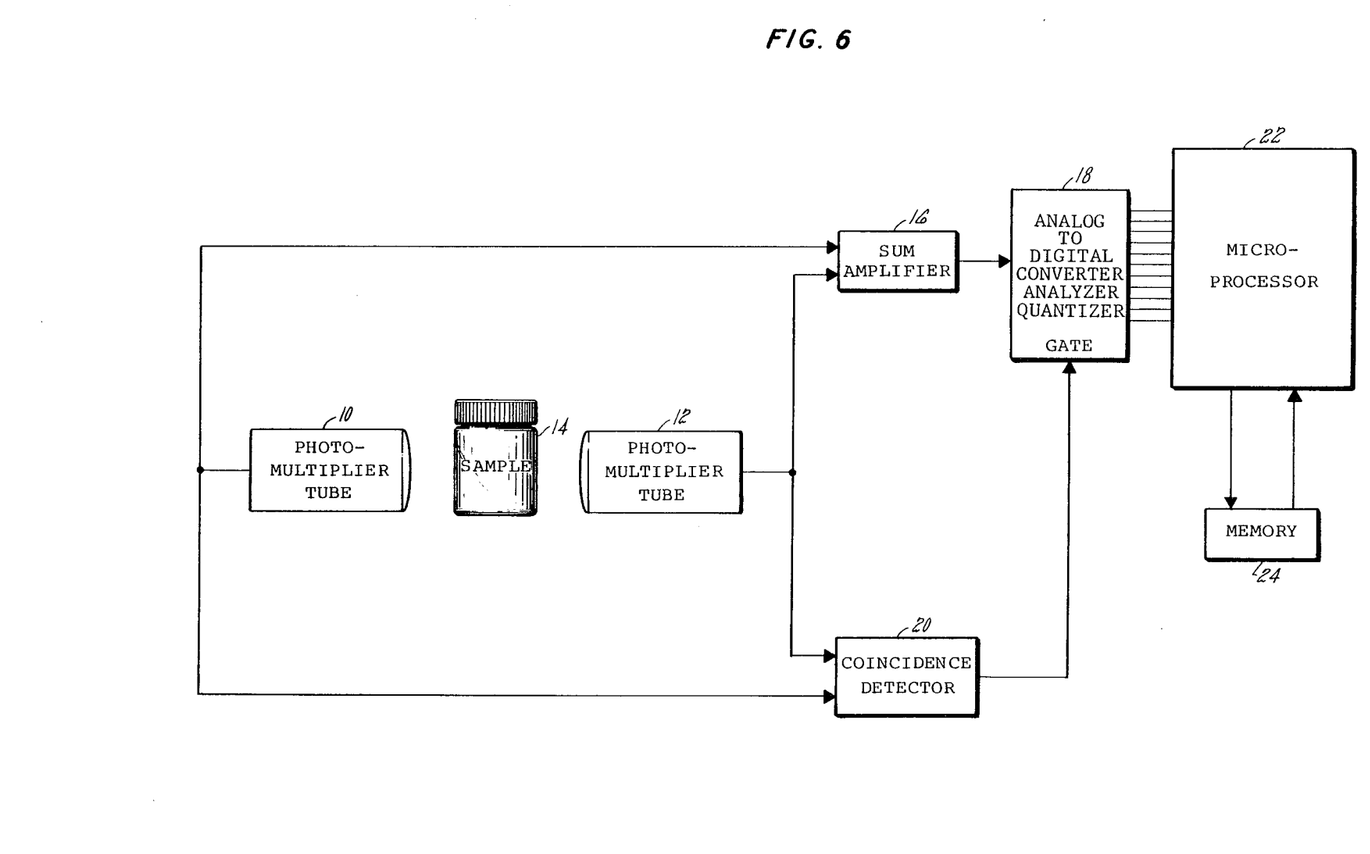
FIG. 6 is a block diagram of a scintillation counting system into which the improved method for determining sample homogeneity of the present invention has been incorporated.

As mentioned earlier, electronic instruments are extensively used in the liquid scintillation counting field by investigators for the purpose of counting various radionuclides. As the use of a microprocessor in the control system of such instruments has become more widespread, additional features have been introduced by changing the programming. Not only does the microprocessor control the internal operation of the scintillation counting system, but its processing capability permits the manipulation of the data by sophisticated programming techniques which dramatically reduce the time and effort for the investigator. One well known system is the Packard TRI-CARB 4000 Series Liquid Scintillation System which is a multichannel analyzer that allows all of the events in a spectrum to be analyzed simultaneously. Referring now to FIG. 6, such a scintillation counting system typically includes a first photomultiplier tube 10 and a second photomultiplier tube 12 which are positioned with an overlapping field of view. The material to be assayed is placed in a sample container 14 which, in the counting mode, is loaded into a centrally disposed position between both photomultiplier tubes 10 and 12. A summing amplifier 16, connected to the output of each of the photomultiplier tubes 10 and 12, both combine the respective output signals and also increase the amplitude level proportionally to the level observed by the photomultiplier tubes. An analyzer, quantizer analog-to-digital converter 18 is connected to the output of the sum amplifier 16 to quantize signal level and to generate a digital number which identifies the specific magnitude of each received pulse. A coincidence detector 20 is provided to distinguish the scintillation event related to radionuclide disintegration from unwanted background energy. In operation, the coincidence detector receives pulses from both photomultiplier tubes 10 and 12 and measures the time difference between the received pulses. If the second pulse is received within a predetermined length of time, or time differential "window", of the first, such an event is concluded to be related to a radioactive decay event; and an enable signal is presented to the analog-to-digital converter 18 to simultaneously gate the combined pulse through to the microprocessor 22. Of course, if a pulse is not received at each input of the coincidence detector 20 within the window, the analog-to-digital converter is not enabled so that no scintillation event is counted. The digital number representing the counted nuclear event is received by a microprocessor 22 and stored in a memory 24 for subsequent use.

Those skilled in the art will appreciate that the foregoing description is general in nature and could describe a number of different scintillation counting systems. A particularly advantageous feature of the sample homogeneity method of the present invention is that it is well suited for implementation by such scintillation counting systems. Thus, a subroutine could easily be written and incorporated in the programming software of the microprocessor 22 to implement the steps of the sample homogeneity method.

Figure 7:
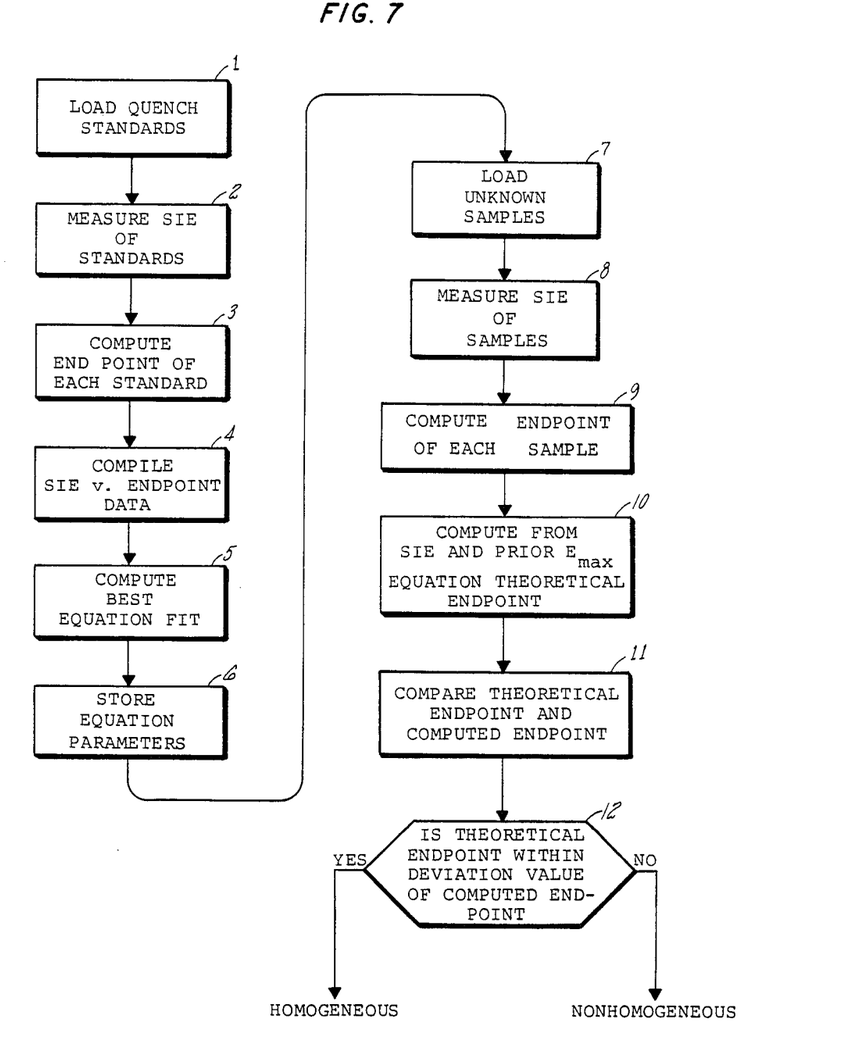
FIG. 7 is a flow chart illustrating the steps of the improved method of the present invention for determining sample homogeneity performed in the scintillation counting system shown in FIG. 6.

Referring now to FIG. 7, there will be described the processing steps of a subroutine followed by a scintillation counting system in implementing the sample homogeneity method of the present invention. As mentioned earlier, where the investigator is employing an external standard criteria, during the first sequence of steps followed by the scintillation counting system, the series of samples prepared by the investigator are loaded into the machine. For example, the first sample of the series will normally be an unquenched sample and consequently no quench material is added to that sample. The second sample would have a small amount of quench material added while the third sample would have a greater quantity of quench material—etc. The net result is a series of, for example, ten samples each of which possesses the same level of the radioactive nuclide but a different amount of quench material that results in a different activity level reading.

During step 2, a sequence of steps is followed whereby each sample container 14 is loaded into the counting position between photomultiplier tubes 10 and 12 so that the activity level of the sample can be measured and recorded for a predetermined period of time, say one minute. As is known, a given beta emitting radionuclide has a characteristic continuum spectrum extending from zero energy level to a maximum energy level, the majority of the disintegration occurring at energy levels in between. The first sample to be measured would typically be the unquenched sample and the SIE corresponding to this sample would be counted as 1000. The first sample of the series is then withdrawn and the second sample is loaded into the count position and its activity level is measured and recorded in a like manner. Since this second sample is slightly quenched, it will be found that the total count will have dropped and the SIE number will be, for example, 890 (see FIG. 1). The foregoing procedure is then repeated for each of the remaining standard samples while the activity level data is measured and stored in the memory 24 of the microprocessor 22.

Next, during the routine identified as step 3, the endpoint of each standard is computed by the appropriate mathematical technique related to the radionuclide of interest. A table (step 4) is formed from the SIE and endpoint data so that a "best fit" equation (step 5) can be determined and stored (step 6).

Finally, the unknown sample or samples, are loaded into the counting position as indicated by step 7. The activity level and SIE valve of each unknown sample is measured (step 8). The endpoint for each identifiable radionuclide in each of the unknown samples is computed (step 9) and stored in the memory 24. The theoretical endpoint obtained from a calibration curve (step 10) is then compared to the computed endpoint (step 11); if the computed endpoint of the unknown sample deviates more than 4% for tritium, or 5% for higher energy radionuclides, from its theoretical endpoint, (step 12) the unknown sample is considered to be non-homogeneous or heterogeneous. Conversely, if the theoretical endpoint is within 5% of the computed endpoint for the unknown sample, it is considered to be homogeneous and the solution counting geometry is correct.

Although this invention has been shown and described with respect to a preferred embodiment, it will be understood by those skilled in this art that various changes in form and detail thereof may be made without departing from the spirit and scope of the claimed invention.

We claim:

1. A liquid scintillation counting system for use with a test sample containing one, or more, radioactive isotopes together with a liquid scintillator, the degeneration of an isotope distributed in a known manner over spectrum, comprising:

transducer means for converting each pulse emanating from said test sample to an electrical signal proportional thereto;

coincidence means connected to said transducer means for eliminating pulses which do not fall within a predetermined time differential window thus passing only those pulses which relate to a nuclear event;

quantizing means connected to said coincidence means for identifying a parameter of each pulse passed by said coincidence means;

processing means, including storage means, connected to said quantizing means for receiving and storing parameter data related to each nuclear event, for calculating the radionuclide endpoint, for calculating a calibration curve associated with each radioactive isotope, and for comparing the computed endpoint of a test sample with the theoretical endpoint to determine if said test sample deviates by more than a predetermined amount thereby identifying heterogeneous states.

2. A method for ascertaining radiochemical homogeneity of a liquid scintillation test sample, comprising the steps of:

(a) calculating a radionuclide calibration equation for each radionuclide of interest from a quench indicating parameter, and calculating a radionuclide endpoint for each radionuclide of interest;

(b) comparing a theoretical endpoint associated with the radionuclide calibration equation with the computed endpoint associated with said test sample to determine if the deviation is greater than approximately 4% for tritium and 5% for higher energy radionuclides thus indicating that the test sample is heterogeneous.

3. A method as set forth in claim 2, wherein step (a) involves the step of measuring the Spectral Index of External Standards (SIE) of a set of appropriate quench standards for each radionuclide of interest and calculating a theoretical endpoint for each radioactive isotope associated with a set of standard samples.

4. the method according to claim 3, further characterized by the steps prior to step (b) of determining the activity level of said test sample to obtain the SIE parameter and calculating the endpoints for each radionuclide of interest.

5. A method for ascertaining radiochemical homogeneity of a liquid scintillation test sample, comprising the steps of:

measuring a quench indicating parameter, of a set of appropriate quench standards for each radionuclide of interest;

calculating a theoretical endpoint for each radioactive isotope in said set of appropriate quench standards;

calculating a radionuclide calibration curve for each radionuclide of interest from the quench indicating parameter data and measured endpoints;

measuring the activity level of a test sample containing unknown radionuclides to obtain a quench indicating parameter calibration curve and calculating the endpoint of the radioactive isotopes in said test sample; and comparing the theoretical endpoint obtained from the calibration curve with the computed endpoint to determine if the deviation is greater than a predetermined amount thus indicating the test sample is heterogeneous.

* * * * *